No. 648,752.  
J. E. JONES.  
PLOW ATTACHMENT.  
(Application filed Feb. 20, 1900.)  
Patented May 1, 1900.
(No Model.)
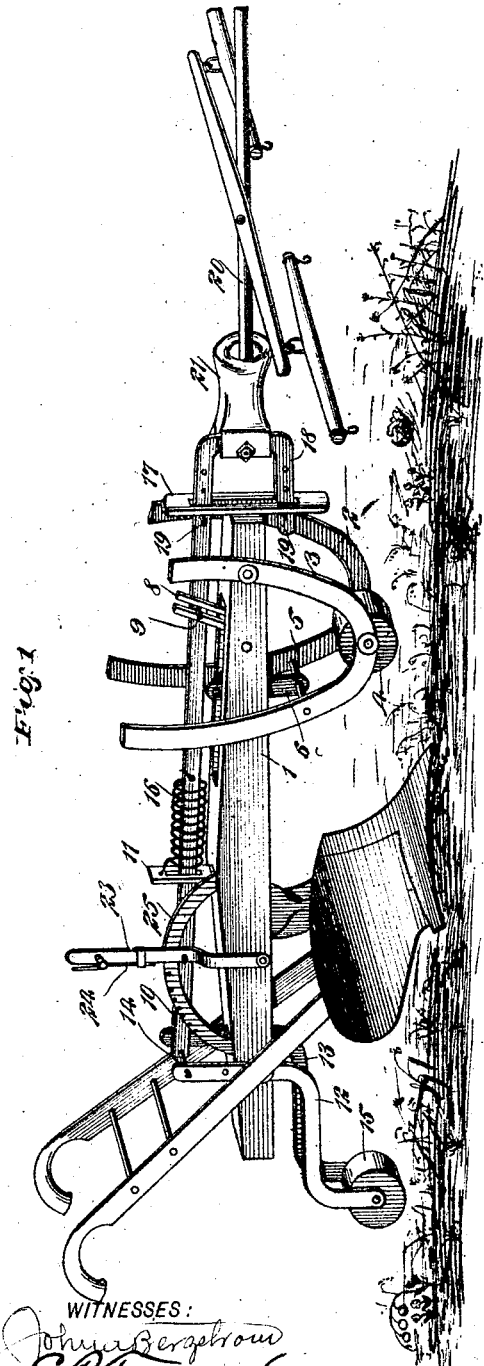
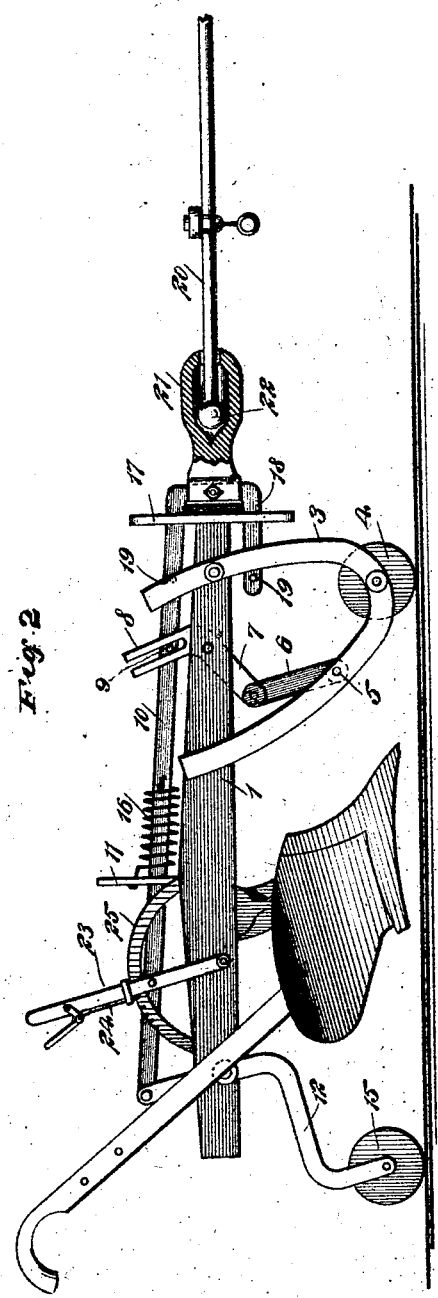
WITNESSES:
INVENTOR  
John E. Jones  
BY  
ATTORNEYS

UNITED STATES PATENT OFFICE.

JOHN EDMOND JONES, OF NORTH BRIDGEWATER, NEW YORK.

PLOW ATTACHMENT.

SPECIFICATION forming part of Letters Patent No. 648,752, dated May 1, 1900.

Application filed February 20, 1900. Serial No. 5,909. (No model.)

*To all whom it may concern:*

Be it known that I, JOHN EDMOND JONES, a citizen of the United States, and a resident of North Bridgewater, in the county of Oneida and State of New York, have invented a new and Improved Plow Attachment, of which the following is a full, clear, and exact description.

This invention relates to improvements in attachments for plows; and one object is to provide a simple means to prevent the plow from jumping out of a furrow should the point strike a stone or the like; further, to provide rollers, one forward and one rearward of the share, with means for simultaneously raising or lowering them, the said means being controlled by the movements of the animals hitched to the plow.

Other objects and advantages will hereinafter appear.

I will describe a plow attachment embodying my invention and then point out the novel features in the appended claims.

Reference is to be had to the accompanying drawings, forming part of this specification, in which similar characters of reference indicate corresponding parts in both the figures.

Figure 1 is a perspective view of a plow having an attachment embodying my invention; and Fig. 2 is a side elevation, partly in section, showing the parts in a different position from that shown in Fig. 1.

Pivotally connected to the forward portion of the beam 1 of the plow are U-shaped hangers 2 3, one being arranged on each side of the beam and the pivot connection with the beam being through the forward arms of the hangers, while the upwardly-curved rear arms engage against the sides of the beam, so as to prevent lateral displacement. A roller 4 has its bearings in the lower portions of the hangers, and from a rod 5, connecting the rear portions of the hangers, a link 6 extends to a pivotal connection with an angle-lever 7, here shown as extended through an opening in the plow-beam and operating on a pivot-bar extended across said opening. The upper member 8 of the angle-lever is provided with a longitudinal slot to receive a pin or the like 9, extended from a draw-bar 10. The draw-bar 10 extends rearward through a guide 11, and at its rear end connects with a frame comprising side members 12 13, pivoted to the rear portion of the plow-beam. The draw-bar is shown as engaging with a cross-rod 14, which connects the upper portions of the frame members 12 13. In the lower portion of the frame members a roller 15 is journaled, this roller of course being rearward of the plowshare. A spring 16 is attached at one end to the draw-bar and at the other end to the guide-plate 11, said spring serving to move the draw-bar rearward, as will be hereinafter described. The forward portion of the draw-bar extends through a guide-plate 17, attached to the front end of the beam, and the draw-bar has a return member 18, which also extends through the guide 17. The draw-bar and member 18 are each provided with a series of perforations, into either one of which pins 19 may be inserted to regulate the amount of forward movement of the draw-bar. A pole or tongue 20 has a universal-joint connection with the draw-bar. As here shown, a socket 21 is attached to the forward end of the draw-bar, and the rear end of the pole or tongue is provided with a ball 22, which will prevent the pole from being drawn out of engagement with the socket. A shifting lever 23 has pivotal connection with the draw-bar and is also pivoted at its lower end to the plow-beam, and a latch 24, movable vertically on the lever, is designed to engage in either one of a series of notches formed in a segment-rack 25, attached to the plow-beam.

In operation when the plow is drawn forward the parts will be substantially in the position shown in Fig. 1, and as the plow in passing through a furrow, the rear roller 15 being engaged with the sides of the furrow slightly above the bottom, will prevent the plow from jumping out of the furrow laterally should the plow-point strike a stone or other obstruction. Should the plow by any means jump upward out of the furrow and then sidewise out of it, it is only necessary to cause the draft-animals to back, so that the ball 22 on the pole 20 engages with the rear wall of the socket 21. As the animals are backed the draw-rod 10 will be moved rearward, which will cause both the front and rear rollers to be moved downward below the plane of the plowshare, as indicated in Fig. 2. Then the plow will be easily moved farther backward on its rollers by the draft-animals and without any exertion on the part of the man attending the plow.

Should it be desired to draw the plow along a road or over ground without plowing, the lever 23 is to be drawn backward and the latch 24 moved into engagement with one of the notches of the rack 25, which will hold the two rollers in their lowermost position. The degree of height of the rollers above the lower portion of the plowshare may be regulated by shifting the pins 19 in the perforations in the parts 10 and 18.

It may be here stated that when the draft-animals are caused to back and before the ball 22 shall have reached the rear wall of the socket the spring 10 will have so acted on the draw-bar as to move the rollers into their lowermost position.

I preferably make the pole or tongue 20 of tubular iron, and by employing the pole or tongue it is obvious that, as before stated, the plow may be moved backward by the animals and, further, as the whiffletrees are mounted on the pole they cannot fall to get underneath the horses' feet.

Having thus described my invention, I claim as new and desire to secure by Letters Patent—

1. The combination with a plow, of a roller forward of the plowshare, a roller rearward of the plowshare, and means operating to simultaneously raise or lower the two rollers, substantially as specified.

2. The combination with a plow, of a roller attached thereto forward of the share, a roller attached to the plow rearward of the share, and means adapted to be actuated by the draft-animals to swing the rollers to their upper position, substantially as specified.

3. The combination with a plow, of a roller supported thereby forward of the share, a roller supported by the plow rearward of the share, means adapted to be operated by the draft-animals for moving and holding said rollers in their uppermost position, and means for moving the rollers to their lowermost position as the forward draft on the plow is relieved, substantially as specified.

4. The combination with a plow, of a frame mounted to swing on the forward portion of the plow-beam, a roller supported in said frame, a frame mounted to swing on the rear portion of the plow-beam, a roller mounted in said rear frame, connections between the frames, comprising a draw-bar, and means for automatically moving said draw-bar in one direction to lower the rollers, substantially as specified.

5. The combination with a plow, of a frame mounted to swing on the forward portion of the beam, a frame mounted to swing on the rear portion of the beam, a roller mounted in each of said frames, an angle-lever pivoted to the beam and having a link connection with the forward frame, a draw-bar having connection with the angle-lever and also with the rear frame, and a spring for moving the draw-bar rearward, substantially as specified.

6. The combination with a plow, of a frame mounted to swing on the forward portion of the beam, a frame mounted to swing on the rear portion of the beam, a roller mounted in each of said frames, connections between said frames comprising a draw-bar, a pole or tongue, and a universal-joint connection between said pole and the draw-bar, substantially as specified.

7. The combination with a plow, of a frame mounted to swing on the forward portion of the beam, a frame mounted to swing on the rear portion of the beam, a roller mounted in each of said frames, a draw-bar connecting the frames, means for adjusting the forward movement of the draw-bar, and means for moving the draw-bar rearward, substantially as specified.

8. The combination with a plow, of a frame mounted to swing on the forward portion of the beam, a frame mounted to swing on the rear portion of the beam, a roller supported in each frame, a draw-bar, connections between the two frames, whereby they may be raised or lowered, a lever having pivotal connection with the draw-bar, and means for securing the lever in its adjusted position, substantially as specified.

9. The combination with a plow, of a frame consisting of substantially U-shaped side pieces, the forward arms of which have pivotal connection with the plow-beam at opposite ends and the rear arms engaging and sliding against the sides of the beam, a roller mounted in the lower portion of said frame, a frame mounted to swing on the rear portion of the plow-beam, a roller mounted in said rear frame, and means for simultaneously operating the frames, substantially as specified.

In testimony whereof I have signed my name to this specification in the presence of two subscribing witnesses.

JOHN EDMOND JONES.

Witnesses:
H. E. PALMER,
M. D. WILLIS.